C. E. ALLENSWORTH.
STRAINER ATTACHMENT FOR COFFEE OR TEA POTS.
APPLICATION FILED JULY 11, 1917.
1,280,625.
Patented Oct. 8, 1918.
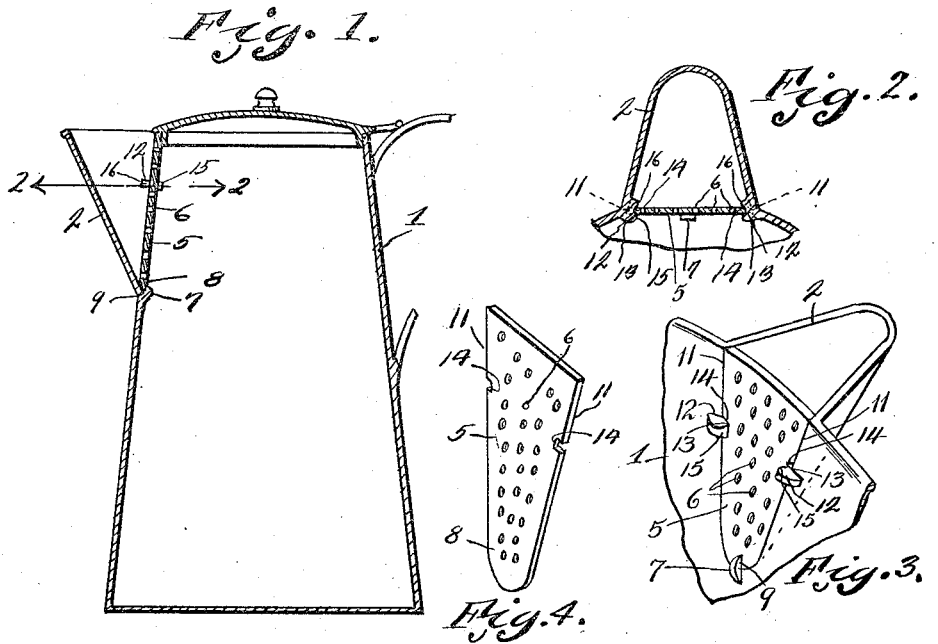
Witnesses
Inventor
C. E. Allensworth
By
her Attorneys

UNITED STATES PATENT OFFICE.

CATHRINE ELLEN ALLENSWORTH, OF CARROLL, NEBRASKA.

STRAINER ATTACHMENT FOR COFFEE OR TEA POTS.

1,280,625. Specification of Letters Patent. Patented Oct. 8, 1918.

Application filed July 11, 1917. Serial No. 180,006.

*To all whom it may concern:*

Be it known that I, CATHRINE E. ALLENSWORTH, a citizen of the United States, residing at Carroll, in the county of Wayne, State of Nebraska, have invented a new and useful Strainer Attachment for Coffee or Tea Pots; and I do hereby declare the following to be a full, clear, and exact description of the invention, such as will enable others skilled in the art to which it appertains to make and use the same.

This invention relates to an improved detachable strainer for the outlet spout for tea and coffee pots, and one of the objects of the invention is to provide a simple, efficient and practical device of this kind, which may be slidably mounted in place adjacent the spout of the pot, and which may be manufactured for a small cost and sold at a reasonable profit.

A further object of the invention is the provision of an improved strainer attachment of this kind having means to prevent the strainer from detachment or falling out, particularly when the tea or coffee pot is tilted.

A further object of the invention is the provision of means consisting of notched lugs on the opposite corners of the spout where said spout merges integrally into the wall of the coffee pot to be engaged by notches on the opposite edges of the strainer plate, to prevent the strainer plate from falling out when the pot is tilted.

In practical fields, the details of construction may necessitate alterations falling within the scope of what is claimed.

The invention comprises further features and combination of parts, as hereinafter set forth, shown in the drawings and claimed.

In the drawings:—

Figure 1 is a vertical sectional view through a tea or coffee pot, showing the means for securing the strainer in place.

Fig. 2 is a sectional view on line 2—2 of Fig. 1.

Fig. 3 is a perspective view of the spout and a portion of the wall of a tea or coffee pot.

Fig. 4 is a detailed perspective view of the strainer plate.

Referring more especially to the drawings, 1 designates a tea or coffee pot, which may be of any suitable shape or configuration, and constructed of any suitable material, and is provided with a spout 2, preferably of the construction and shape, as shown.

The wall of the tea or coffee pot, where the base of the spout merges integrally into the wall, a lug 7 is provided, to overlie and hold the lower end 8 of the strainer 5 in place. The spout 2 near the interior of the coffee pot has a crotch 9 curved, as shown, and the lower end 8 of the strainer plate is correspondingly curved, to fit the crotch 9 of the spout 2, whereby the opposite edges 11 of the strainer plate will engage the opposite walls of the spout adjacent where it merges into the wall of the tea or coffee pot. The opposite walls of the spout where it merges into the wall of the pot, are provided with lugs 12 having notches 13, which are engaged by the crotches of the notches 14 of the opposite edges of the strainer plate 5, when the strainer plate is inserted in position. The strainer plate 5 is provided with a plurality of perforations 6 through which tea or coffee is strained, the tea or coffee passing off through the spout 2 while the tea leaves or coffee grounds are retained in the pot. To insert the strainer plate 5, it is necessary to spring the plate, so as to cause the crotches of the notches 14 (which straddle the lugs 12) to ride over the bulges 15 of said lugs 12, and after the strainer plate is in place, movement or displacement of the strainer plate toward the center of the pot is prevented by the bulges 15. The bulges 16 of said lugs 12 prevent movement of the strainer plate outwardly toward the spout, and owing to the notches 14 straddling the lugs 12, upward movement of the strainer plate is prevented when the tea or coffee pot is tilted in pouring out its contents. By the provision of a device as aforesaid, tea or coffee may be easily strained when pouring the same out for use, and moreover, the strainer may be easily and quickly removed for cleaning purposes.

The invention having been set forth, what is claimed as new and useful is:—

In combination with a tea or coffee pot having a spout merging integrally into the wall of the pot, the wall of the pot adjacent the corners where the spout merges integrally into the wall having notched lugs, a strainer plate corresponding in shape and fitting the spout where it connects to the wall of the pot, the opposite edges of the strainer plate having notches straddling said lugs, whereby the crotches of the notches of the strainer plate may coöperate with the notches of the lugs to lock the strainer plate in place, the crotch of the spout where it
5 merges into the wall of the pot having a lug overlying the lower end of the strainer plate to retain said end in place.

In testimony whereof I have signed my name to this specification in the presence of two subscribing witnesses.

CATHRINE ELLEN ALLENSWORTH.

Witnesses:
V. G. WILLIAMS,
B. R. ATKINSON.

Copies of this patent may be obtained for five cents each, by addressing the "Commissioner of Patents, Washington, D. C."